(12) United States Patent
Harada

(10) Patent No.: US 9,160,012 B2
(45) Date of Patent: Oct. 13, 2015

(54) POROUS MATERIAL FOR FUEL CELL ELECTROLYTE MEMBRANE, METHOD FOR PRODUCING THE SAME, ELECTROLYTE MEMBRANE FOR SOLID POLYMER FUEL CELL, MEMBRANE ELECTRODE ASSEMBLY (MEA), AND FUEL CELL

(75) Inventor: Hiroshi Harada, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/291,872

(22) Filed: Nov. 8, 2011

(65) Prior Publication Data

US 2012/0058412 A1 Mar. 8, 2012

Related U.S. Application Data

(62) Division of application No. 12/296,454, filed as application No. PCT/JP2007/059006 on Apr. 19, 2007.

(30) Foreign Application Priority Data

Apr. 19, 2006 (JP) ................. 2006-115726

(51) Int. Cl.
*H01M 8/02* (2006.01)
*H01M 8/10* (2006.01)

(52) U.S. Cl.
CPC .......... *H01M 8/0291* (2013.01); *H01M 8/1016* (2013.01); *Y02E 60/521* (2013.01)

(58) Field of Classification Search
CPC .......... H01M 8/10; H01M 2300/0065; H01M 8/1018; H01M 2008/1095; H01M 2008/00

USPC .......... 429/400; 427/115, 553, 555
See application file for complete search history.

(56) References Cited

U.S. PATENT DOCUMENTS 6,130,175 A 10/2000 Rusch et al.
6,302,934 B1 10/2001 Nabata et al.
(Continued)

FOREIGN PATENT DOCUMENTS

DE 69909409 1/2004
DE 69909409 T2 * 1/2004 ............. B01D 39/16
(Continued)

OTHER PUBLICATIONS

Office Action for German Appl. No. 11 2007 000 960.8 dated Jul. 1, 2011.
(Continued)

*Primary Examiner* — Barbara Gilliam
*Assistant Examiner* — Angela Martin
(74) *Attorney, Agent, or Firm* — Finnegan, Henderson, Farabow, Garrett & Dunner, LLP

(57) ABSTRACT

According to the present invention, a porous material for a fuel cell electrolyte membrane, wherein at least one strength auxiliary layer is provided inside and/or on the surface of a high porosity layer, the high porosity layer and the strength auxiliary layer constitute a multilayer structure, and the average diameter of pores of the high porosity layer is different from the average diameter of pores of the strength auxiliary layer, is provided. Also, a porous material having high porosity and high strength, which is suitable as a base material for an electrolyte membrane of a solid polymer fuel cell, is provided and a high-performance fuel cell using such material is realized.

3 Claims, 7 Drawing Sheets

(56) References Cited

U.S. PATENT DOCUMENTS

| | | | |
|---|---|---|---|
| 6,562,446 B1* | 5/2003 | Totsuka | 428/304.4 |
| 6,828,407 B2* | 12/2004 | Sasaki et al. | 528/86 |
| 7,625,652 B2 | 12/2009 | Uensal et al. | |
| 2005/0118479 A1 | 6/2005 | Yamaguchi et al. | |
| 2005/0181254 A1 | 8/2005 | Uensal et al. | |
| 2005/0260478 A1* | 11/2005 | Mino et al. | 429/34 |
| 2006/0286422 A1* | 12/2006 | Nakato et al. | 429/30 |
| 2010/0047669 A1* | 2/2010 | Uensal et al. | 429/40 |

FOREIGN PATENT DOCUMENTS

| | | | | |
|---|---|---|---|---|
| DE | 102 54 732 | 6/2004 | | |
| DE | 103 92 357 | 3/2005 | | |
| EP | 1005891 | 6/2000 | | |
| EP | 1518282 | 3/2005 | | |
| EP | 1518282 B1 * | 3/2005 | | H01M 2/00 |
| EP | 1 548 863 | 6/2005 | | |
| JP | 5-75835 | 10/1993 | | |
| JP | 6-231779 | 8/1994 | | |
| JP | 10-44348 | 2/1998 | | |
| JP | 2000-225328 | 8/2000 | | |
| JP | 2002-25583 | 1/2002 | | |
| JP | 2002-164056 | 6/2002 | | |
| JP | 2002-203576 | 7/2002 | | |
| JP | 2002-367655 | 12/2002 | | |
| JP | 2004-217921 | 8/2004 | | |
| JP | 2005-50561 | 2/2005 | | |
| JP | 2005-68396 | 3/2005 | | |
| JP | 2005-216667 | 8/2005 | | |
| JP | 2005-310485 | 11/2005 | | |
| JP | 2006-100267 | 4/2006 | | |
| JP | 2007-165204 | * | 6/2007 | H01M 8/02 |
| WO | WO 03/092090 | 11/2003 | | |

OTHER PUBLICATIONS

Office Action mailed Jun. 4, 2012, in copending U.S. Appl. No. 12/296,454.
Office Action mailed Jul. 2, 2012, in copending U.S. Appl. No. 13/291,738.
Office Action for U.S. Appl. No. 13/291,738 mailed Jan. 16, 2013.
Office Action for U.S. Appl. No. 12/296,454 mailed Jan. 9, 2013.
Office Action for U.S. Appl. No. 12/296,454 mailed Aug. 14, 2013.
Office Action for U.S. Appl. No. 13/291,738 mailed Oct. 2, 2013.
Notice of Allowance and Fee(s) Due for U.S. Appl. No. 12/296,454 dated Feb. 18, 2014.
Final Office Action for U.S. Appl. No. 13/291,738 dated Apr. 9, 2014.
Office Action for U.S. Appl. No. 12/296,454 dated Oct. 22, 2014.
Office Action for U.S. Appl. No. 13/291,738 dated Jul. 14, 2014.
Notice of Allowance and Fee(s) Due for U.S. Appl. No. 13/291,738 dated Feb. 25, 2015.

* cited by examiner

POROUS MATERIAL FOR FUEL CELL ELECTROLYTE MEMBRANE, METHOD FOR PRODUCING THE SAME, ELECTROLYTE MEMBRANE FOR SOLID POLYMER FUEL CELL, MEMBRANE ELECTRODE ASSEMBLY (MEA), AND FUEL CELL

This is a divisional application of U.S. application Ser. No. 12/296,454, which is a national phase of international application No. PCT/JP2007/059006, filed Apr. 19, 2007, which claims priority to Japanese application No. 2006-115726, filed Apr. 19, 2006. Each of these applications is incorporated herein by reference.

TECHNICAL FIELD

The present invention relates to a porous material for a fuel cell electrolyte membrane and a method for producing the same. It also relates to an electrolyte membrane for a solid polymer fuel cell, a membrane electrode assembly (MEA), and a fuel cell using the same. More specifically, the present invention relates to a porous material for an electrolyte membrane for a solid polymer fuel cell, which is suitable as an electrolyte membrane base material used for a fuel cell and has high porosity so as to maintain high ionic conductivity when filled with a polyelectrolyte and to have improved mechanical strength and dimensional stability such that fuel cell durability can be improved.

In fuel cells, a fuel such as hydrogen or methanol is electrochemically oxidized such that the chemical energy of the fuel is directly converted into electrical energy so as to be supplied. In recent years, fuel cells have been gaining attention as clean electrical energy supply sources. In particular, solid polymer fuel cells, in which a proton conductive membrane is used as an electrolyte, are expected to serve as electric vehicle power sources. This is because high power density can be obtained with the use thereof and they can be operated at low temperatures.

The basic structure of such solid polymer fuel cell comprises an electrolyte membrane and a pair of gas diffusion electrodes each having a catalyst layer, such gas diffusion electrodes being separately bonded to both sides of the electrolyte membrane, and it further comprises a current collector on each side thereof. A fuel such as hydrogen or methanol gas is supplied to one gas diffusion electrode (anode) and an oxidant such as oxygen or air is supplied to the other gas diffusion electrode (cathode). Then, an external load circuit is connected between the both gas diffusion electrodes. Accordingly, the fuel cell is operated. At such time, protons generated in the anode are transferred through an electrolyte membrane to the cathode side and react with oxygen in the cathode, resulting in water generation. Herein, an electrolyte membrane functions as a proton transfer medium and as a diaphragm for hydrogen gas and oxygen gas. Thus, an electrolyte membrane is required to have high proton conductivity, strength, and chemical stability.

In order to improve the power generation performance of solid polymer fuel cells, electrical resistance can be reduced by increasing the sulfonic group concentration of a solid polymer electrolyte membrane and decreasing the thickness thereof. However, a significant increase in the sulfonic group concentration is problematic because such increase causes reduction in the mechanical strength and in the tear strength of an electrolyte membrane, dimensional changes upon handling, deterioration in durability during a long-term operation due to an increased risk of creep of an electrolyte membrane, and the like. Meanwhile, a decrease in thickness is also problematic because such decrease causes reduction in the mechanical strength and in the tear strength of an electrolyte membrane, deterioration in processability/handleability when an electrolyte membrane is bonded to a gas diffusion electrode, and the like.

Thus, JP Patent Publication (Kokoku) No. 5-75835 B (1993) suggests a method wherein a fluorine-based ion exchange polymer having sulfonic groups is allowed to impregnate a polytetrafluoroethylene (hereinafter to be referred to as PTFE) porous membrane. In such case, although thickness reduction can be achieved, the electric resistance of a porous PTFE membrane does not decrease to a sufficient extent, which is problematic. In addition, according to the above method, complete bonding in the interface between a PTFE porous membrane and the ion exchange polymer cannot be achieved. Thus, when such membrane is used as an electrolyte membrane for a solid polymer fuel cell, hydrogen gas leakage is increased due to poor adhesiveness after long-hour use, resulting in a decrease in cell performance, which is problematic.

In addition, JP Patent Publication (Kokai) No. 6-231779 A (1994) suggests, as a means for attenuating the high electrical resistance of a membrane, a fibrillar, woven-fabric, or non-woven-fabric cation exchange membrane reinforced with a perfluorocarbon polymer. Such membrane has low resistance and thus the power generation characteristics of a fuel cell produced with the use of such membrane are relatively good. However, the membrane thickness is 1 at least 00 to 200 μm, which is not sufficiently thin. In addition, thickness variations are observed. Thus, such fuel cell is insufficient in terms of power generation characteristics and mass productivity. In addition, sufficient adhesiveness between a perfluorocarbon polymer and a fluorine-based ion exchange polymer having sulfonic groups cannot be obtained, and thus hydrogen gas permeability is relatively high. Accordingly, power output obtained as a result of fuel cell construction is not sufficient.

Further, JP Patent Publication (Kokai) No. 2002-25583 A discloses, as a mass-producible cation-exchange membrane serving as a reinforcing thin film having thin and uniform thickness and low hydrogen gas permeability, an electrolyte membrane for a solid polymer fuel cell, having a laminate comprising two or more cationic ion exchange layers comprising a perfluorocarbon polymer having sulfonic groups. In the case of such membrane, at least one cationic ion exchange layer is reinforced with a fibrillar reinforcing material comprising a fluorocarbon polymer and at least one cationic ion exchange layer is not substantially reinforced with a reinforcing material. However, for practical use of fuel cells, further improvement of durability is necessary. Therefore, mechanical strength must be improved.

DISCLOSURE OF THE INVENTION

As described above, in order to compensate for mechanical strength that is insufficient in a polymer electrolyte membrane, a method wherein a resin porous membrane is inserted as a reinforcing material inside an electrolyte membrane can be used. It is effective to reduce the porosity of a resin porous membrane in order to impart sufficient strength to the resin porous membrane such that it can serve as a reinforcing material. Meanwhile, it is effective to increase the porosity of such a porous membrane in order to improve the performance of an electrolyte. There is a trade-off relationship between the above two physical properties. Thus, at present, it is an important objective to improve such two physical properties.

Specifically, an electrolyte membrane is an ion-permeable material and thus the degree of its ionic conductivity significantly influences cell power generation performance. Meanwhile, a material used as a reinforcing material has no ionic conductivity. Thus, such material obviously causes high resistance against ionic conductivity when it is inserted inside an electrolyte membrane. Therefore, in order to improve the performance of an electrolyte, it is necessary to reduce the volume fraction of a reinforcing material in an electrolyte membrane (=to improve the porosity of a reinforcing material). In such case, reduction in the volume fraction of a reinforcing material causes a decrease in reinforcing effects, such that sufficient strength cannot be secured. This causes a trade-off relationship.

Thus, it is an objective of the present invention to provide a porous material having high porosity and high strength that is suitable as a base material for an electrolyte membrane of a solid polymer fuel cell, and to realize a high-performance fuel cell using the same.

As a result of intensive studies, the present inventors have found that the above problems can be solved by using a porous material having a specific multilayer structure. This has led to the completion of the present invention.

Specifically, in a first aspect, the present invention concerns a porous material for a fuel cell electrolyte membrane, wherein at least one strength auxiliary layer is provided inside and/or on the surface of a high porosity layer, the high porosity layer and the strength auxiliary layer constitute a multilayer structure, and the average diameter of pores of the high porosity layer is different from the average diameter of pores of the strength auxiliary layer.

The number of layers of the porous material for a fuel cell electrolyte membrane of the present invention is not limited as long as the membrane has a multilayer structure comprising a high porosity layer and a strength auxiliary layer. However, a typical example thereof preferably has the following structure:

(1) a three-layer structure (strength auxiliary layer/high porosity layer/strength auxiliary layer); or (2) a three-layer structure (high porosity layer/strength auxiliary layer/high porosity layer).

According to the present invention, the above strength auxiliary layer is composed of a dense portion and pores.

In the case of the porous material for a fuel cell electrolyte membrane of the present invention, stretching is preferably employed for through-hole formation. In preferred examples, the above high porosity layer is obtained by subjecting a dense polymer film to stretching once and the above strength auxiliary layer is obtained by subjecting a dense polymer film to stretching a plurality of times.

Further, in addition to stretching, a high energy beam is employed for through-hole formation. For instance, in preferred examples, the above high porosity layer and/or the above strength auxiliary layer is/are obtained by irradiating a dense polymer film with a neutron beam and/or a laser for fine through-hole formation.

Preferably, the strength auxiliary layer of the present invention has a dense portion with many through holes (finger-void porous structure). Further, the above high porosity layer preferably has a sponge-like bicontinuous structure (fibrillar structure).

In the case of the porous material for a fuel cell electrolyte membrane of the present invention, it is preferable that the pore diameter of the strength auxiliary layer be larger than the largest through-hole diameter of the high porosity layer. Herein, the average diameter of pores of the above strength auxiliary layer is preferably 0.01 to 10 µm. The aperture ratio of pores of the above strength auxiliary layer is preferably 5% to 50%.

A wide range of conventionally known support materials for electrolyte membranes for solid polymer fuel cells can be used as materials constituting a laminate structure of the porous material for a fuel cell electrolyte membrane of the present invention. In preferred examples, the high porosity layer and the strength auxiliary layer comprise polytetrafluoroethylene (PTFE).

In a second aspect, the present invention concerns a method for producing the above porous material for a fuel cell electrolyte membrane, wherein at least one strength auxiliary layer is formed inside and/or on the surface of a high porosity layer such that the high porosity layer and the strength auxiliary layer constitute a multilayer structure, and the average diameter of pores of the high porosity layer is different from the average diameter of pores of the strength auxiliary layer. Herein, the strength auxiliary layer is preferably composed of a dense portion and pores. Also, a typical example of the laminate structure of the porous material for a fuel cell electrolyte membrane is as described above.

A method for forming the high porosity layer and/or the strength auxiliary layer is not limited. Thus, the following general methods and other methods can be used: an extrusion method using an extrusion molding machine; a casting method comprising casting a solution onto a flat plate; a method for applying a solution to a flat plate with a die coater, a comma coater, or the like; and a method for stretching a molten polymer material.

Specifically, a preferred example of a production method comprises laminating a strength auxiliary layer obtained as a result of stretching a dense polymer film and a high porosity layer comprising a dense polymer film and subjecting the laminate to another stretching.

In addition, as described above, a layer obtained by irradiating a dense polymer film with a neutron beam and/or a laser for fine through-hole formation can be used as the high porosity layer and/or the strength auxiliary layer.

As described above, according to the present invention, it is preferable that the strength auxiliary layer have a dense portion with many through holes (finger-void porous structure), and that the high porosity layer have a sponge-like bicontinuous structure (fibrillar structure).

Further, as described above, it is preferable that the pore diameter of the strength auxiliary layer be larger than the largest through-hole diameter of the high porosity layer, that the average diameter of pores of the strength auxiliary layer be 0.01 to 10 µm, that the aperture ratio of pores of the strength auxiliary layer be 5% to 50%, and that the high porosity layer and the strength auxiliary layer comprise polytetrafluoroethylene (PTFE).

In a third aspect, the present invention concerns a polymer electrolyte membrane for a solid polymer fuel cell, comprising, as a base material, the above porous material for a fuel cell electrolyte membrane and being filled with a polyelectrolyte.

In a forth aspect, the present invention concerns a membrane electrode assembly (MEA), wherein a catalyst layer is positioned on both sides of a polymer electrolyte membrane for a solid polymer fuel cell comprising, as a base material, the above porous material for a fuel cell electrolyte membrane.

In a fifth aspect, the present invention concerns a solid polymer fuel cell having a membrane electrode assembly (MEA) comprising: a polymer electrolyte membrane (a); and a gas diffusion electrode (b) comprising, as main constituent materials, a conductive carrier supporting a catalytic metal and an electrode catalyst comprising a proton conductivity material and being bonded to the electrolyte membrane, wherein the polymer electrolyte membrane is the above electrolyte membrane for a solid polymer fuel cell.

With the use of the electrolyte membrane for a solid polymer fuel cell of the present invention, a fuel cell that is excellent in mechanical strength (resulting in improved durability), chemical stability, and proton conductivity can be obtained.

A porous material for an electrolyte membrane for a solid polymer fuel cell has at least a strength auxiliary layer inside and/or on the surface of a high porosity layer, the high porosity layer and the strength auxiliary layer constitute a multilayer structure, and the average diameter of pores of the high porosity layer is different from the average diameter of pores of the strength auxiliary layer. In such case, a porous material for an electrolyte membrane for a solid polymer fuel cell, which is suitable as a base material for an electrolyte membrane used for fuel cells, can be obtained, provided that such porous material has high porosity so as to maintain high ionic conductivity when filled with a polymer electrolyte and provided that it has improved mechanical strength and dimensional stability, thus allowing fuel cell durability to be improved.

BEST MODE FOR CARRYING OUT THE INVENTION

Figure 1A:
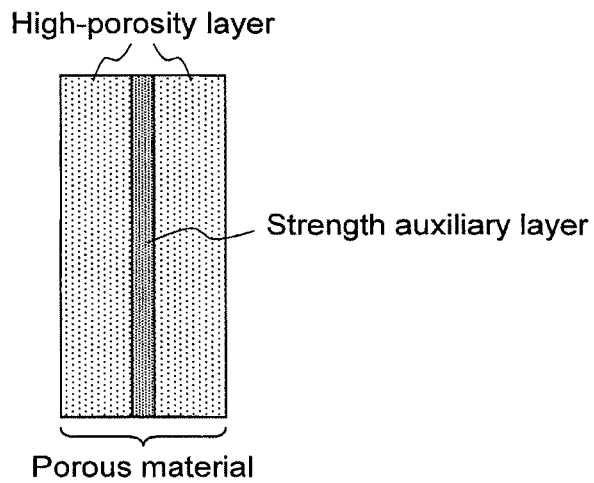
FIG. 1A schematically shows a reinforced (core-reinforced) multilayer electrolyte membrane.
Figure 1B:
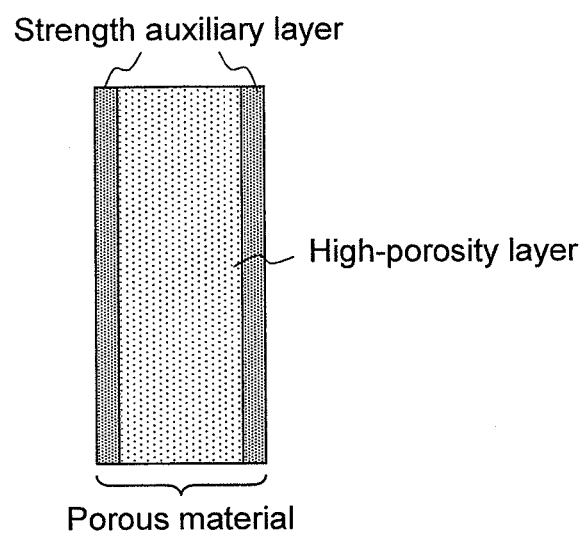
FIG. 1B schematically shows a reinforced (surface-reinforced) multilayer electrolyte membrane.

FIGS. 1A and 1B show structural examples of the porous material for an electrolyte membrane for a solid polymer fuel cell of the present invention. FIG. 1A shows a porous material having a three-layer structure (high porosity layer/strength auxiliary layer/high porosity layer). FIG. 1B shows a porous material having a three-layer structure (strength auxiliary layer/high porosity layer/strength auxiliary layer).

According to the present invention, at least one strength auxiliary layer is provided inside or on the surface of a porous material (reinforcing material). In order to increase membrane strength when using a membrane having a uniform porous structure and being made of a uniform material, it is necessary to increase the membrane thickness. Thus, when such material is used as a reinforcing material for an electrolyte membrane, the membrane resistance increases, resulting in a decrease in cell performance. Therefore, in a case in which a high-strength and thin-filmed porous material is provided inside or on the surface of a membrane, the total membrane thickness of a reinforcing material can be decreased while the same strength can be imparted thereto.

Regarding the structure of a high porosity layer, a porous material having a sponge-like bicontinuous structure is used. When reinforcing effects in the membrane thickness direction cannot be obtained (in the case of a finger-void structure), the stress caused by swelling of an electrolyte is directed in the membrane thickness direction. Accordingly, the effects of a reinforcing material decrease. Reinforcing effects in the membrane thickness direction can be imparted in the case of a sponge-like bicontinuous structure (fibrillar structure).

It is better that a strength auxiliary layer have a structure in which finger-void through holes having large diameters are formed on a dense membrane. The presence of a dense portion in a strength auxiliary layer allows even a thin film to have high strength. In addition, reduction in substance permeability (permeation resistance) can be minimized by forming finger-void through holes. In addition, when the pore diameter of a strength auxiliary layer is smaller than the largest through-hole diameter of a high-porosity layer, substance permeability significantly decreases. Thus, in order to maintain high substance permeability, it is preferable that such pore diameter be larger than the largest through-hole diameter of a high-porosity layer. The pore diameter is preferably 0.01 to 10 μm, more preferably 1 to 10 μm, and most preferably 2 to 3 μm.

Further, the effective aperture ratio of a strength auxiliary layer is 5% to 50%. When it is 5% or less, substance permeability significantly decreases. When it is 50% or more, the effects of a strength auxiliary layer are reduced.

When a strength auxiliary layer is applied as a reinforcing material for a fuel cell electrolyte membrane, it is positioned in the center portion of the membrane such that impregnation properties or the interface resistance of an electrolyte can be reduced. When a strength auxiliary layer with a high area fraction of a resin portion on the membrane surface thereof is positioned on the surface of a reinforcing material, the impregnation properties of an electrolyte (in a solution form or in a fusion state) are reduced. Thus, when a strength auxiliary layer is applied as an electrolyte-reinforcing material for an electrolyte membrane, it is preferable that it be positioned in the center portion of a reinforcing material. In addition, in a case in which a strength auxiliary layer is positioned in the center of a reinforcing material, adhesion between an electrolyte and a reinforcing material can be improved, resulting in the improvement of peel resistance.

EXAMPLES

The present invention is hereafter described in greater detail with reference to the Examples and the Comparative Example.

Comparative Example

Figure 2:
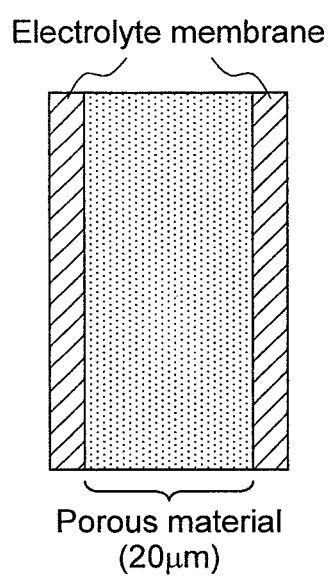
FIG. 2 schematically shows a reinforced monolayer electrolyte membrane prepared in the Comparative Example.

PTFE porous membranes were prepared by a stretching method which is a publicly known method for forming a PTFE porous membrane. Specifically, naphtha serving as a liquid lubricant was uniformly dispersed in a PTFE fine powder. The mixture was subjected to preliminary molding→paste extrusion such that round-rod-shaped beads were prepared. Next, the beads were inserted between a pair of metallic pressure rolls. Thus, long uncalcined tape A was prepared. The tape A was subjected to monoaxial stretching such that fibrillar PTFE porous membranes I (porosity: 80% (20 μm)) were obtained. An obtained porous membrane I was used as a reinforcing material and formed into a complex with a commercially available fuel cell electrolyte, namely, Nafion (Du Pont) (by a casting method, a melt impregnation method, or the like). Thus, the reinforced monolayer electrolyte membrane shown in FIG. 2 was prepared, followed by evaluation.

Example 1

A reinforced electrolyte membrane was prepared by film forming with the use of a reinforcing material comprising a strength auxiliary layer having a high porosity layer on both sides thereof under the same conditions as those applied for the formation of a complex in the Comparative Example, followed by evaluation. A method for producing a reinforcing material having a multilayer structure is described below in detail.

Firstly, a PTFE porous membrane prepared by the stretching method described in the Comparative Example was positioned on both sides of uncalcined tape A obtained in the Comparative Example. The resultant was subjected to thermocompression bonding (at the melting point or at a lower temperature) for bonding. Next, the obtained film having a three-layer structure was subjected to monoaxial stretching. Accordingly, a reinforcing material (total porosity: 80% (20 µm)) having a three-layer structure, in which the inner-layer structure was different from the outer-layer structure (porosity: internal porosity<outer porosity), was prepared.

Figure 3:
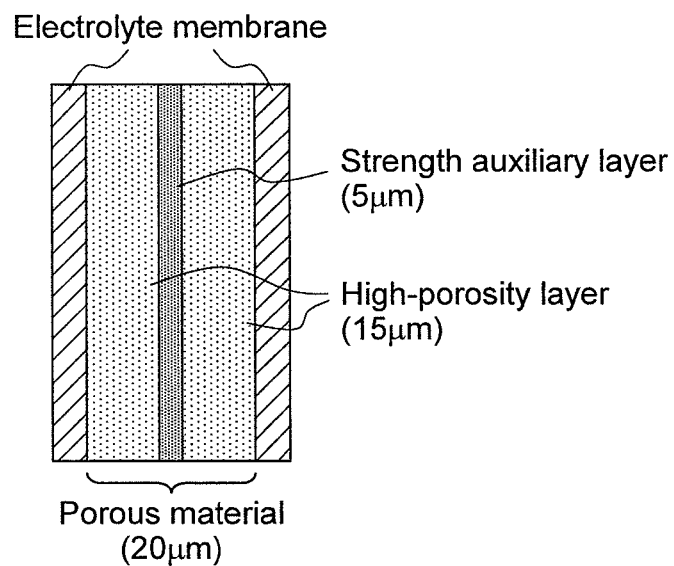
FIG. 3 schematically shows a reinforced (core-reinforced) multilayer electrolyte membrane prepared in Example 1.

In addition, regarding a method for producing the reinforced multilayer electrolyte membrane shown in FIG. 3, a method comprising applying a PTFE suspension to a surface forming a porous membrane interface and causing thermal fusion at the melting point or at a greater temperature may be used.

Example 2

A reinforced electrolyte membrane was prepared by film forming with the use of a reinforcing material comprising a high porosity layer having a strength auxiliary layer on both sides thereof under the same conditions as those applied for the formation of a complex in the Comparative Example, followed by evaluation. A method for producing a reinforcing material having a multilayer structure is described below in detail.

Firstly, a PTFE porous membrane prepared by the stretching method described in the Comparative Example was designated as the center portion and uncalcined tape A obtained in the Comparative Example was positioned on both sides thereof. The resultant was subjected to thermocompression bonding (at the melting point or at a lower temperature) for bonding. Next, the obtained film having a three-layer structure was subjected to monoaxial stretching as in Example 1. Accordingly, a reinforcing material (total porosity: 80% (20 µm)) having a three-layer structure, in which the inner-layer structure was different from the outer-layer structure (porosity: internal porosity>outer porosity), was prepared.

Figure 4:
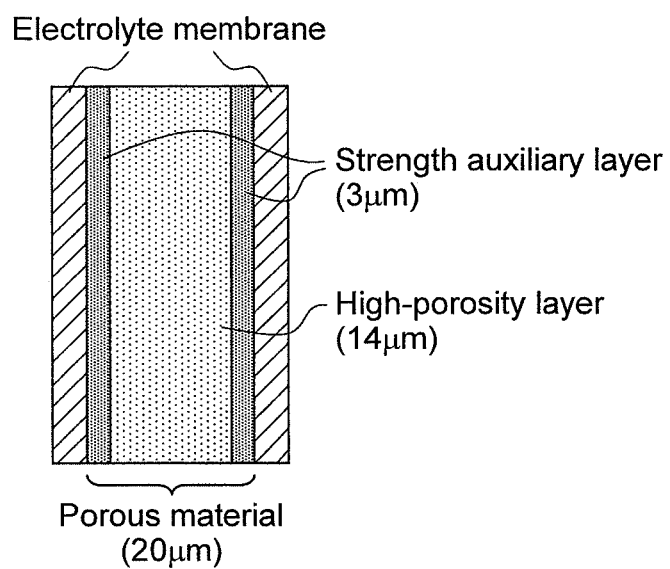
FIG. 4 schematically shows a reinforced (surface-reinforced) multilayer electrolyte membrane prepared in Example 2.

In addition, regarding a method for producing a reinforced multilayer electrolyte membrane shown in FIG. 4, a method comprising applying a PTFE suspension to a surface forming a porous membrane interface and causing thermal fusion at the melting point or at a greater temperature may be used.

Example 3

A reinforced electrolyte membrane was prepared by film forming with the use of a reinforcing material comprising a strength auxiliary layer (with a finger-void porous structure) having a high porosity layer on both sides thereof under the same conditions as those applied for the formation of a complex in the Comparative Example, followed by evaluation. A method for producing a reinforcing material having a multilayer structure is described below in detail.

Figure 5:
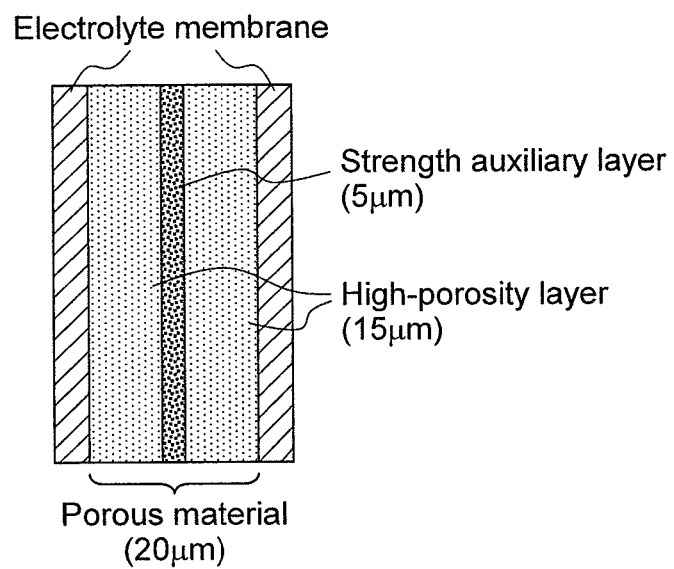
FIG. 5 schematically shows a reinforced multilayer electrolyte membrane prepared in Example 3.

Firstly, PTFE porous membranes 1 used as high porosity layers were prepared by the stretching method described in the Comparative Example. Next, each dense PTFE film was irradiated with a neutron beam, a laser, or the like such that fine through holes were formed thereon. Thus, porous membranes I and II with a finger-void structure (pore diameter: 0.2 µm) to be used for a strength auxiliary layer were prepared. The obtained porous membranes I and II were bonded with each other by thermocompression bonding (at the melting point or at a lower temperature) employed in Example 1 or thermal fusion with the use of a PTFE suspension as a binder. Thus, a reinforced multilayer electrolyte membrane (total porosity: 80% (20 µm)) shown in FIG. 5 was prepared.

[Evaluation Method]

The above composite electrolyte membranes prepared in the Comparative Example and Examples 1 to 3 were evaluated by the following methods. Upon evaluation, the total membrane thickness of each composite membrane and that of each reinforcing material were regarded as being constant.

(Pore Diameter)

For examination of the porous structure of a reinforcing material, the through-hole diameter distribution of each reinforcing material was determined with the use of a palm porosimeter (Seika Corporation). Comparison and evaluation in terms of the largest hole diameter value (bubble point) were carried out.

(Porosity)

For examination of the porous state of each reinforcing material, the volume (size×membrane thickness) and the weight of the relevant porous membrane were measured. The porosity of the porous membrane was calculated by the following equation.

$$\text{Porosity}(\%) = (1 - (\text{membrane weight (g)}/(2.2 \text{ (g/cm}^3) \text{ [PTFE true density]} \times \text{membrane volume (cm}^3))) \times 100$$

(Air Permeability)

For evaluation of the substance permeability of each reinforcing material, the Gurley value was measured. The term "Gurley value" used herein refers to the number of seconds necessary for air (100 cc) to pass through a membrane at a pressure of 0.879 gf/mm$^2$ in accordance with JIS P8117.

(Mechanical Strength)

For examination of reinforcing effects, each reinforced composite membrane was subjected to a tensile test. The yield stress thereof was measured, followed by comparison.

(Dimensional Stability)

For comparison in terms of dimensional changes as a result of swelling of an electrolyte membrane via water absorption, the rate of dimensional change of a membrane in a dried state and that of a membrane in a moistened and saturated state were obtained by the following equation, followed by comparison and evaluation. That is, the smaller the value, the greater the dimensional stability.

$$\text{Rate of dimensional change}(\%) = (\text{swollen membrane size (mm)} \times \text{dried membrane size (mm)}/\text{dried membrane size (mm)}) \times 100$$

(Ionic Conductivity)

For evaluation of the electrolyte membrane performance of each obtained membrane, the proton conductivity was measured by a four-terminal method with the use of an impedance analyzer (TOYO Corporation).

(Power Generation Characteristics)

For evaluation of the power generation performance of a fuel cell membrane, each composite membrane obtained by film forming was bonded with a gas diffusion electrode via thermocompression bonding such that a membrane electrode assembly (MEA) was prepared. Then, the current-voltage curve was obtained for evaluation.

[Results]

The evaluation results of physical properties for the reinforced membranes and the electrolyte membranes are listed in table 1 below.

TABLE 1

| | Reinforcing material | | | Electrolyte membrane (subjected to composite formation) | | |
|---|---|---|---|---|---|---|
| | Pore diameter (μm) | Porosity (%) | Air permeability (s) | Mechanical strength (MPa) | Dimensional stability (%) | Ionic conductivity (S/cm) |
| Comparative Example | 0.10 | 80 | 120 | 30 | 15 | 0.070 |
| Example 1 | 0.12 | 81 | 140 | 40 | 13 | 0.069 |
| Example 2 | 0.11 | 79 | 180 | 45 | 11 | 0.068 |
| Example 3 | 0.10 | 82 | 120 | 55 | 7 | 0.070 |

The results in table 1 indicate that the use of a reinforcing material having a multilayer structure results in the simultaneous achievement of the maintenance of ionic conductivity and the improvement of mechanical strength (dimensional stability) in Examples 1 to 3. In addition, the comparison of the results of Examples 1 and 2 and those of Example 3 indicates that the use of a strength support layer having a finger-void porous structure results in the achievement of good substance permeability (air permeability) and good dimensional stability.

Figure 6:
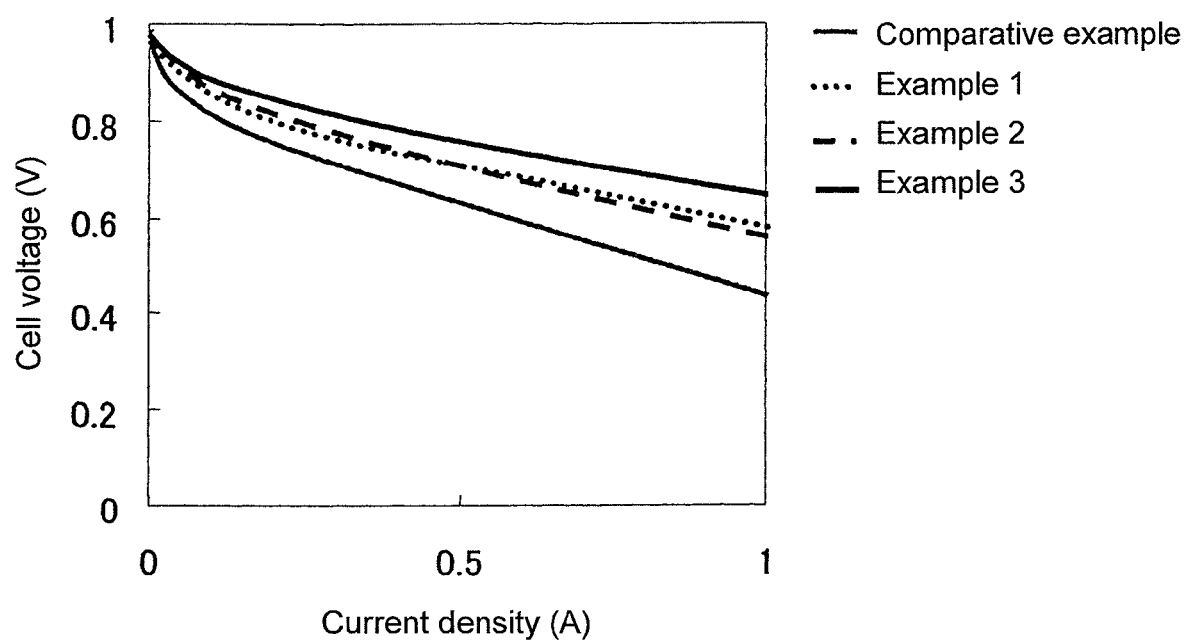
FIG. 6 shows I-V characteristic evaluation results obtained by subjecting MEAs produced using composite membranes prepared in Comparative Example and Examples 1 to 3 to a continuous test at a cell temperature of 80° C.

Next, power generation characteristic evaluation after long-hour power generation was examined. MEAs produced using the composite membranes prepared in Comparative Example 1 and Examples 1 to 3 were subjected to a continuous test at a cell temperature of 80° C., followed by evaluation of I-V characteristics. The results shown in FIG. 6 were obtained. That is, the samples used in the Examples were superior to the sample used in the Comparative Example in terms of dimensional stability. It is considered, therefore, that the stress experienced by a membrane upon membrane swelling due to power generation was suppressed and the detachment at the membrane-electrode interface was reduced, resulting in the improvement of durability. In addition, in Example 3, the performance in terms of initial characteristics was better than those obtained in Examples 1 and 2. Therefore, no significant decrease in performance was observed, even after a continuous test. It was considered that this was because a strength support layer comprising a dense membrane having a finger-void structure had low substance permeation resistance while maintaining its strength.

INDUSTRIAL APPLICABILITY

A porous material for an electrolyte membrane for a solid polymer fuel cell, wherein at least one strength auxiliary layer is provided inside and/or on the surface of a high porosity layer, the high porosity layer and the strength auxiliary layer constitute a multilayer structure, and the average diameter of pores of the high porosity layer is different from the average diameter of pores of the strength auxiliary layer, can be obtained. Such porous material for an electrolyte membrane for a solid polymer fuel cell is suitable as an electrolyte membrane base material used for a fuel cell and has high porosity so as to maintain high ionic conductivity when filled with a polyelectrolyte and to have improved mechanical strength and dimensional stability such that fuel cell durability can be improved. A membrane electrode assembly (MEA) comprising such electrolyte membrane is excellent in terms of bonding between a catalyst layer and an electrolyte membrane, ionic conductivity, and mechanical strength, it has good I-V characteristics, and further, it has improved durability. Accordingly, high-performance fuel cells can be realized, contributing to practical and widespread use of fuel cells.

The invention claimed is:

1. A polymer electrolyte membrane for a solid polymer fuel cell, comprising:
   a porous material, as a base material, being filled with a polyelectrolyte,
   wherein the porous material has a multi-layer structure consisting of at least one strength auxiliary layer and at least one high porosity layer, the at least one strength auxiliary layer being provided inside and/or on a surface of the at least one high porosity layer,
   wherein the at least one strength auxiliary layer has a dense portion and through holes, and the at least one high porosity layer has a sponge-like bicontinuous structure, and
   wherein an average diameter of pores of the at least one strength auxiliary layer is 0.01 to 10 μm, different from an average diameter of pores of the at least one high porosity layer, and larger than a largest through-hole diameter of the at least one high porosity layer.

2. A membrane electrode assembly, wherein a catalyst layer is positioned on both sides of the polymer electrolyte membrane according to claim 1.

3. A solid polymer fuel cell having a membrane electrode assembly comprising:
   the polymer electrolyte membrane according to claim 1; and
   a gas diffusion electrode,
   wherein the gas diffusion electrode comprises, as main constituent materials,
   a conductive carrier supporting a catalytic metal, and
   an electrode catalyst comprising a proton conductivity material and being bonded to the polymer electrolyte membrane.

* * * * *